United States Patent

Haven

[15] 3,675,049

[45] July 4, 1972

[54] VARIABLE DIGITAL DELAY USING MULTIPLE PARALLEL CHANNELS AND A SIGNAL-DRIVEN BIT DISTRIBUTOR

[72] Inventor: Roger Lindsy Haven, North Kingstown, R.I.

[73] Assignee: Western Electric Company, Incorporated, New York, N.Y.

[22] Filed: April 24, 1970

[21] Appl. No.: 31,689

[52] U.S. Cl. ........................307/293, 307/221 R, 307/223 R, 307/244, 328/43, 328/55, 328/103

[51] Int. Cl. ........................H03k 17/26

[58] Field of Search ........................307/221, 223, 244, 293; 328/37, 43, 55, 103, 105, 106, 152, 153

[56] References Cited

UNITED STATES PATENTS

| | | | |
|---|---|---|---|
| 3,156,896 | 11/1964 | Martin et al. | 328/67 X |
| 3,546,599 | 12/1970 | Konotchick, Jr. | 328/153 X |
| 3,173,094 | 3/1965 | Hoegeman, Jr. | 328/105 X |
| 3,207,916 | 9/1965 | Slow | 307/223 |
| 3,461,313 | 8/1969 | Hansen | 328/153 X |
| 3,115,608 | 12/1963 | Guillon | 328/105 |
| 3,281,700 | 10/1966 | Young | 307/223 X |

*Primary Examiner*—Stanley D. Miller, Jr.
*Attorney*—R. J. Guenther and William L. Keefauver

[57] ABSTRACT

A device for delaying the bits of a serial data stream particularly suitable for producing a variable delay for a large number of bit times. Bits of the incoming data stream are sequentially applied to the inputs of a number of parallel delay channels by a bit distributor. The outputs of all the delay channels are logically "OR"ed together to reform the data stream. The distributor advances only after a "one" has been applied to a delay channel; therefore, fewer data channels are necessary than the number which corresponds to the maximum delay produced by the system.

9 Claims, 1 Drawing Figure

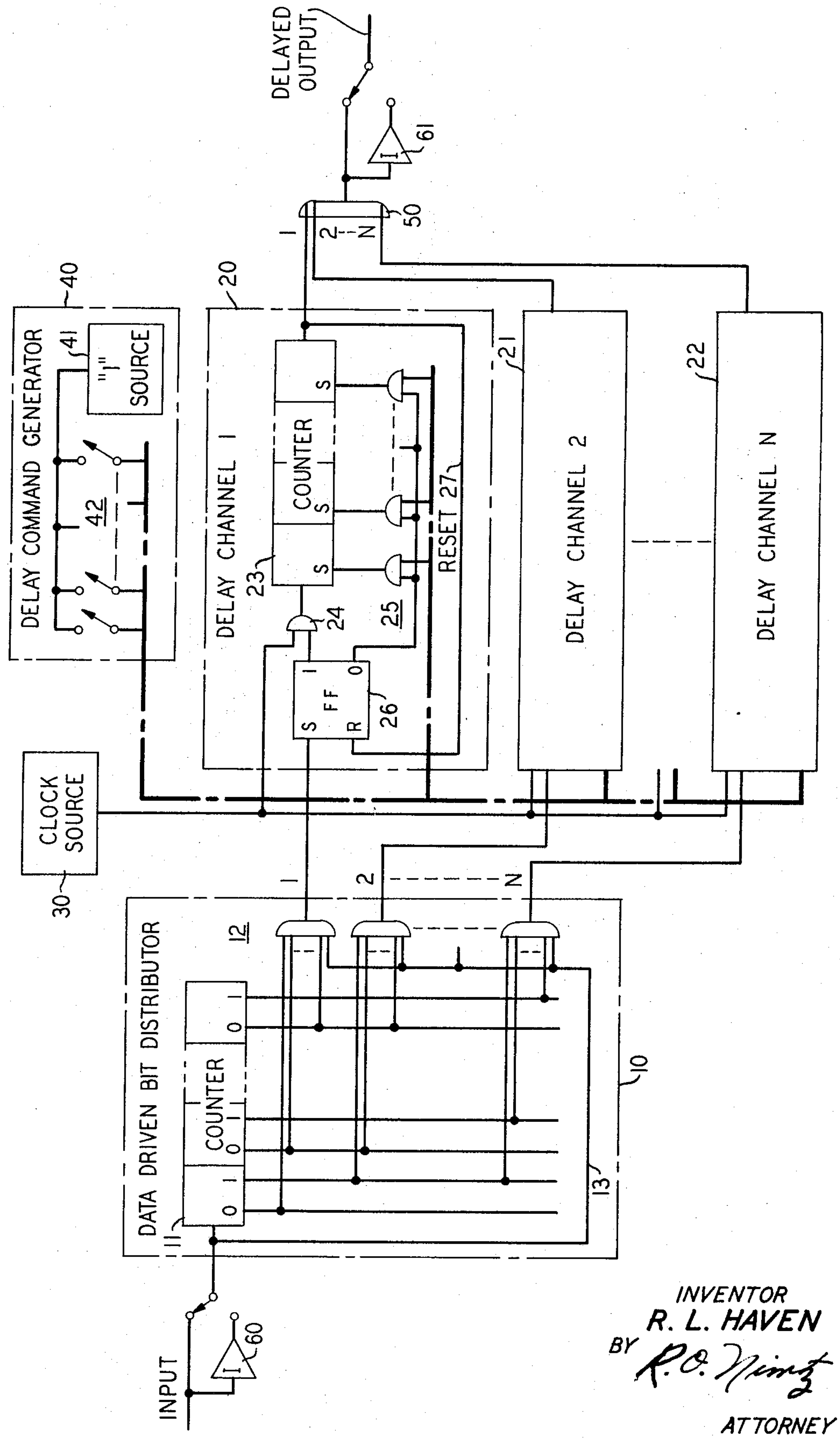
INVENTOR
R. L. HAVEN
BY R.O. Nimtz
ATTORNEY

VARIABLE DIGITAL DELAY USING MULTIPLE PARALLEL CHANNELS AND A SIGNAL-DRIVEN BIT DISTRIBUTOR

GOVERNMENT CONTRACT

The invention herein claimed was made in the course of or under a contract with the Department of the Army.

BACKGROUND OF THE INVENTION

1. Field of the Invention

This invention relates to digital delay systems, and particularly to systems which produce a relatively large value of delay.

2. Description of the Prior Art

In handling serial data streams, it is occasionally necessary to introduce long delays which may be varied under control of an operator or external circuit. Such delays are particularly useful in radar and sonar applications.

Delay may be introduced into a serial bit stream in either an analog or digital fashion. In the analog case, a voltage varying between two levels representing one and zero logical values may be impressed on an acoustical or electrical delay line. In the digital case, the input stream of ones and zeros may be applied to a shift register which is repeatedly shifted by a clock signal.

A shift register delay is simple to implement and may even be made variable by tapping the output off at intermediate stages. However, for long delay values, a correspondingly long shift register is needed. As the number of stages increases, the cost rises linearly and the probability of failure due to the failure of a single stage also rises. A method of combating the increased probability of failure is the paralleling of a number of separate data delay channels which further increases the expense of the total system. For relatively long delays, it may be elected to use analog delay lines, but these are relatively expensive and it is not a simple task to make them variable.

SUMMARY OF THE INVENTION

This invention overcomes the above-described disadvantages by providing a number of parallel delay channels which may be shift registers, but are more advantageously counters, thereby causing the number of counter stages to increase as the base 2 logarithm of the maximum delay produced. The total reliability of this system is enhanced by the plurality of parallel channels performing independently of one another. As will be shown below, the data bits are distributed over the various channels in response to the data in the bit stream. This results in a random distribution of the data bits over the delay channels. Hence the failure of any one channel does not cause a catastrophic failure of the system but merely introduces a random noise component into the data bit stream.

Further, the total delay may be made adjustable by using an auxiliary circuit to preset the counters in the delay channels, thereby causing them to complete their count and produce an output in less than the maximum time.

The heart of this invention is a data-driven bit distributor which applies the bits of the data stream to the input of each counter delay channel in turn. The distributor is arranged to advance to the next channel only after the occurrence in the data stream of a one. Data bits of zero do not cause the distributor to advance. In this way, a one data bit is launched on one delay channel, then the distributor advances to the next channel where it waits for the occurrence of another one. After a one is launched on a given delay channel, the delay counter counts down without interruption and produces an output pulse at the end of its count. Due to the action of the bit distributor selecting only ones from the data stream for delay, fewer delay channels are needed than the total delay introduced.

The total savings possible in the number of channels is dependent upon the characteristics of the data stream. The fewer the number of ones occurring in the data stream, the fewer the number of channels which are necessary to accommodate them. For a very sparse population of ones, there can be a considerable savings. On the other hand, if the occurrence of ones is more probable than zeros, a channel savings can still be advantageously obtained. This is done by inverting the original bit stream (changing ones to zeros, and vice versa), delaying the now relatively sparse ones, then reinverting the output.

The above properties will be understood from the following description of the accompanying drawing which shows a detailed circuit diagram of a digital delay system in accordance with the present invention.

Details of the circuit construction of an illustrative AND gate, OR gate and inverter will be found in FIGS. 3–5 of U.S. Pat. No. 3,188,453 issued June 8, 1965, to H. A. Schneider and assigned to the present assignee. Details of a representative flip-flop circuit and its use in a multi-stage binary counter will be found in FIGS. 1 and 4, respectively, of U.S. Pat. No. 3,351,778 issued Nov. 7, 1967, to W. C. Seelbach et al.

DETAILED DESCRIPTION OF THE DRAWING

Input data, a serial bit stream comprising ones and zeros, is applied to the circuit shown in the drawing at the input lead on the far left. The input may be routed through inverter 60 or may be applied directly to the input of distributor 10. The purpose of inverter 60 will be explained later in this description; for now, it is assumed that the input data is applied directly to the left-hand input terminal of distributor 10.

Distributor 10 comprises counter 11 and output gates 12 interconnected in a standard one-out-of-N decoding arrangement; e.g., there is one output gate 12 for each of the N possible states of counter 11; and for any given value of the count, one and only one of the output gates is enabled.

Input data is applied directly to the least significant counter stage of counter 11. Hence, the counter is incremented by the occurrence of each one in the bit stream while zeros have no effect. As counter 11 is incremented, gates 12 are successively enabled.

The input bits are also applied directly to one of the inputs on each of the N output gates through lead 13. Therefore, a one occurring on the input lead will be directed by lead 13 and gated through the currently enabled output gate onto one of the N output leads. Simultaneously, counter 11 will be incremented by one, thus advancing the enabling signal to the next gate in sequence.

Each of the N outputs for distributor 10 is applied to one of N delay channels shown as elements 20-22 in the drawing. Circuit details are shown for only the first of the N delay channels, since they are all identical in construction. The input to the delay channel 1, element 20, coming from bit distributor 10 is applied to the "set" input of flip-flop 26. The "set" output of flip-flop 26 is applied to one input of AND gate 24; the other input to gate 24 is connected to a source of clock pulses, source 30. When flip-flop 26 has been set by the occurrence of a one on the lead coming from distributor 10, clock pulses form source 30 are passed through gate 24 to the least significant counting stage of counter 23. Counter 23 counts from its initially set value until overflow occurs from the most significant bit position. The overflow bit is conveyed through reset lead 27 to the reset input of flip-flop 26, thereby preventing further counting. The overflow bit is also propagated to one input of OR gate 50, thereby producing an output bit in the delayed data stream emerging from the output of OR gate 50.

When flip-flop 26 is in the reset condition, the lead emerging from the reset output side enables gates 25. The second lead to each of gates 25 is connected to an output from delay command generator 40 which produces the initial count to be gated into counter 23. The output of each of the gates 25 is connected to the set input of one of the flip-flops in counter 23, thereby allowing the initial count produced by generator 40 to be set into counter 23.

Generator 40 produces the initial count by the application through switches 42 of a logical one voltage level produced by source 41 to the input of selected gates 25. Since the reset signal on lead 27 is produced by an overflow signal from the most significant bit position of counter 23, it follows that counter 23 is at that moment in the all-zero state. The action of resetting flip-flop 26 disables gate 24, thereby preventing additional clock pulses from incrementing the counter and enabling the initial count appearing on the switches 42 to be gated into the counter 23.

The outputs of the N delay channels are connected to the N inputs to OR gate 50. OR gate 50 combines the outputs from the N delay channels to form the delayed output data stream. Ones in the delayed output appear due to the completion of the count down by delay channels. Zeros appear because of the absence of a one.

Inverters 60 and 61 are inserted in the input and output data streams respectively when the data stream is composed of more ones than zeros. In this way, the roles of the ones and zeros are interchanged at the input and again at the output, thereby allowing a minimum number of delay channels to be used with either the sparsely settled ones condition or the sparsely settled zeros condition.

What is claimed is:

1. A digital delay for use with a serial bit stream of ones and zeros comprising:

a plurality of delay channels, each of said channels including a counter as a delay element, a bit distributor arranged to apply the bits in said stream to successive delay channels, wherein said distributor advances to the succeeding channel only after the application of a one, means for combining the outputs of said channels, and a delay command generator arranged to preset the counters in said delay channels to an initial value.

2. A digital delay as described in claim 1 further comprising at least one inverter operating on said serial bit stream.

3. A delay device comprising:

a plurality of counters, each of said counters commencing autonomous counting in response to the occurrence of a one in an input binary bit stream and ending with the attainment of a predetermined count value at which time an output pulse is produced, a distributor interposed between said counters and said input stream which selects a single counter to commence counting with the occurrence of each one in said stream, means for combining the outputs of said counters into an output bit stream.

4. The method of delaying a serial bit stream composed of ones and zeros comprising the steps of:

distributing all the ones and only the ones of the bit stream to separate delay channels, delaying each said one in its respective delay channel, wherein said step of delaying comprises counting a predetermined interval, and recombining the outputs from said channels.

5. The method of claim 4 further comprising the step of inverting the bits of said stream.

6. The method of claim 4 further comprising the steps of:

presetting a counter to an initial value, initiating autonomous counting, detecting a predetermined count, stopping said autonomous counting, and emitting an output signal.

7. Apparatus comprising:

a source of data bits composed of serial ones and zeros, a multiplicity of delay channels, said delay channels comprising counting means, means for sequentially distributing said data bits to the inputs of said channels, means for advancing said distributing means only after the distribution of a one, and means for logically "OR"ing the outputs of said channels.

8. Apparatus as in claim 7 further comprising means for presetting said counting means for a predetermined value.

9. Apparatus as in claim 7 further comprising means for inverting said data bits.

* * * * *